(12) United States Patent
Fukuchi

(10) Patent No.: US 11,005,102 B2
(45) Date of Patent: May 11, 2021

(54) BINDER FOR SECONDARY BATTERY, BINDER RESIN COMPOSITION FOR SECONDARY BATTERY, ELECTRODE FOR SECONDARY BATTERY, AND SECONDARY BATTERY

(71) Applicant: Samsung SDI Co., Ltd., Gyeonggi-do (KR)

(72) Inventor: Iwao Fukuchi, Yokohama (JP)

(73) Assignee: SAMSUNG SDI CO., LTD., Yongin-si (KR)

( * ) Notice: Subject to any disclaimer, the term of this patent is extended or adjusted under 35 U.S.C. 154(b) by 31 days.

(21) Appl. No.: 16/446,361

(22) Filed: Jun. 19, 2019

(65) Prior Publication Data
US 2019/0305315 A1    Oct. 3, 2019

Related U.S. Application Data

(63) Continuation of application No. PCT/KR2017/014554, filed on Dec. 12, 2017.

(30) Foreign Application Priority Data

Dec. 20, 2016  (JP) .............................. JP2016-246152
Nov. 22, 2017  (KR) ......................... 10-2017-0156533

(51) Int. Cl.
| | |
|---|---|
| *H01M 4/62* | (2006.01) |
| *H01M 10/0525* | (2010.01) |
| *C08L 33/02* | (2006.01) |
| *H01M 4/02* | (2006.01) |

(52) U.S. Cl.
CPC ............. *H01M 4/622* (2013.01); *C08L 33/02* (2013.01); *H01M 10/0525* (2013.01); *C08L 2203/20* (2013.01); *C08L 2205/025* (2013.01); *C08L 2205/03* (2013.01); *C08L 2205/035* (2013.01); *H01M 2004/027* (2013.01)

(58) Field of Classification Search
CPC ........... H01M 4/622; H01M 2004/027; H01M 10/0525; C08L 33/02
USPC ......................................................... 524/43
See application file for complete search history.

(56) References Cited

U.S. PATENT DOCUMENTS

| | | | |
|---|---|---|---|
| 2007/0073022 A1 | 3/2007 | Yuasa | |
| 2010/0129724 A1 | 5/2010 | Kolosnitsyn | |
| 2013/0216891 A1 | 8/2013 | Byun et al. | |
| 2013/0236764 A1 | 9/2013 | Hu et al. | |
| 2013/0280606 A1* | 10/2013 | Sekine ................ | C08F 220/18 |
| | | | 429/211 |
| 2014/0287308 A1 | 9/2014 | Okada | |
| 2015/0372305 A1 | 12/2015 | Matsuo | |
| 2017/0062828 A1 | 3/2017 | Sonobe | |
| 2017/0069913 A1 | 3/2017 | Yano | |

FOREIGN PATENT DOCUMENTS

| | | |
|---|---|---|
| JP | 2007-52940 | 3/2007 |
| JP | 2007-119736 | 5/2007 |
| JP | 2011-521405 A | 7/2011 |
| JP | 2013-073107 | 4/2013 |
| JP | 5733219 B2 | 6/2015 |
| KR | 10-2008-0074241 A | 8/2008 |
| KR | 10-2013-0096138 A | 8/2013 |
| KR | 10-2014-0116190 A | 10/2014 |
| KR | 10-1501321 B1 | 3/2015 |
| KR | 10-1616721 B1 | 4/2016 |
| WO | WO 2013/081152 | 6/2013 |
| WO | WO 2014/119481 | 8/2014 |
| WO | WO 2015/133492 | 9/2015 |
| WO | WO 2015/186363 | 12/2015 |

OTHER PUBLICATIONS

International Search Report received in PCT Application No. PCT/KR2017/014554 dated Apr. 12, 2018.
Written Opinion received in PCT Application No. PCT/KR2017/014554 dated Apr. 12, 2018.

* cited by examiner

*Primary Examiner* — Hui H Chin
(74) *Attorney, Agent, or Firm* — Knobbe, Martens, Olson & Bear LLP

(57) ABSTRACT

The present application relates to a binder for a secondary battery. The binder includes a first copolymer unit including a carboxyl group-containing acrylic monomer and at least one of an acrylic acid derivative monomer and a substituted or unsubstituted styrene and a second copolymer unit including a residue of a polymer azo initiator. A mass ratio of the second copolymer unit relative to a total mass of the first copolymer unit and the second copolymer unit is 10 mass % to 40 mass %.

11 Claims, 1 Drawing Sheet

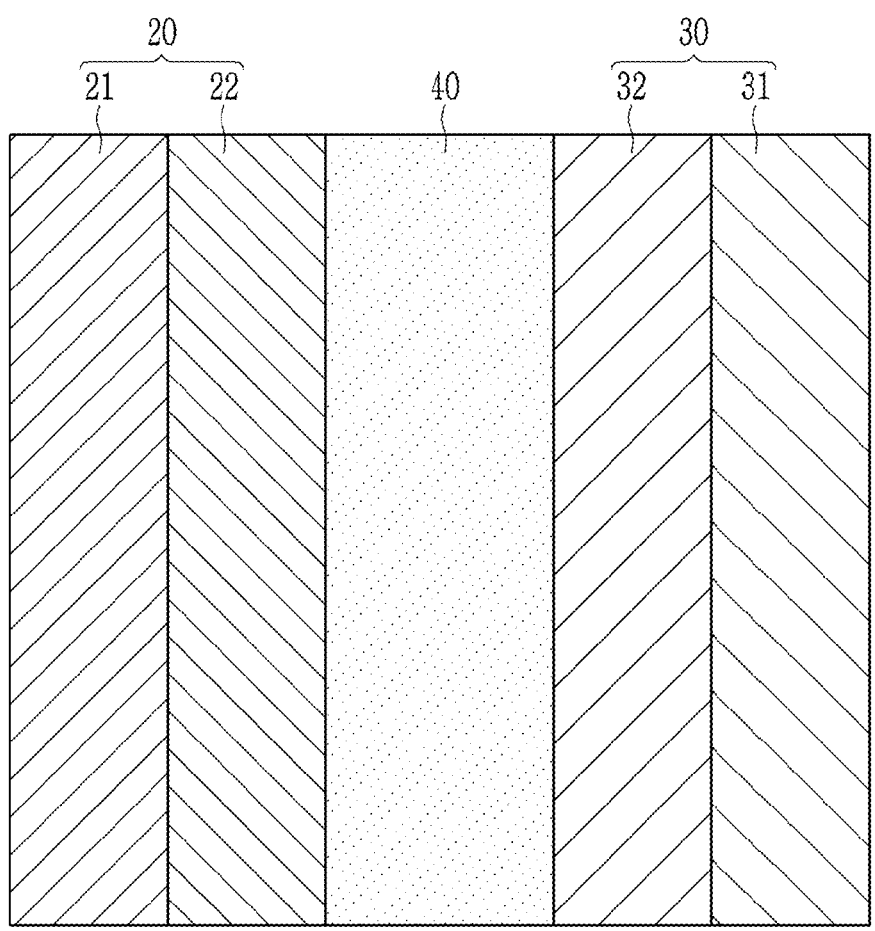

BINDER FOR SECONDARY BATTERY, BINDER RESIN COMPOSITION FOR SECONDARY BATTERY, ELECTRODE FOR SECONDARY BATTERY, AND SECONDARY BATTERY

INCORPORATION BY REFERENCE TO ANY PRIORITY APPLICATIONS

This application is a continuation application and claims the benefit under 35 U.S.C. §§ 120 and 365 of PCT Application No. PCT/KR2017/014554, filed on Dec. 12, 2017, which is hereby incorporated by reference. PCT/KR2017/014554 also claimed priority to Japanese Patent Application No. 2016-246152 filed on Dec. 20, 2016 and Korean Patent Application No. 10-2017-0156533 filed on Nov. 22, 2017, both of which are hereby incorporated by reference.

BACKGROUND

Field

The described technology relates to a binder for a secondary battery, a binder resin composition for a secondary battery, an electrode for a secondary battery, and a secondary battery are disclosed.

Description of Related Technology

A non-aqueous electrolyte secondary battery is being widely used as a power source for portable devices such as laptops, smartphones, or the like and therefore there is a high demand for development of high voltage/high capacity non-aqueous electrolyte secondary batteries. As for a negative material (negative active material) for this non-aqueous electrolyte secondary battery, in addition to a lithium metal or a lithium alloy, a graphite carbon material capable of intercalating/deintercalating Li ions such as natural graphite or artificial graphite and the like are used.

Recently, the demand for high capacity batteries for down-sized and multifunctional portable devices has increased, and as a result, research activity has increased for development of a novel negative active material replacing the carbon-based active material (for example, the graphite carbon material) currently used widely as a negative active material.

As for the novel negative active material, a tin (Sn) alloy, a silicon (Si) alloy, a silicon (Si) oxide, a lithium (Li) nitride, and the like are paid attention to, but at the present, charge and discharge cycle characteristics of these novel negative active materials still fall short of those of the graphite carbon material.

Since the carbon-based active material has a layered structure, and Li is intercalated/deintercalated into these layers during the charge and discharge, expansion/contraction thereof during the Li intercalation/deintercalation is small. On the contrary, the novel negative active material and particularly, a silicon-based active material has a more complex structure than that of the carbon-based active material and simultaneously, a larger amount of the intercalated/deintercalated Li per unit mass during the charge and discharge. Accordingly, the silicon-based active material shows large expansion/contraction according to the charge and discharge, and as a result, during charge and discharge cycles of repeating the expansion/contraction, an electrode is greatly swollen, and accordingly, a short circuit or electronic conductivity deterioration of the active material occurs due to destruction of the electrode structure. On this account, a charge and discharge cycle-life thereof is known to be extremely deteriorated compared with that of the graphite carbon material.

Accordingly, in order to generally reconcile the high capacity and the charge and discharge cycle-life, the novel negative active material may not be used alone but frequently used as a mixture with the carbon-based active material. However, in this case, the novel negative active material is so largely expanded and contracted that an electrode may be swollen and thus may have a difficulty in accomplishing the high capacity.

Recently, in order to overcome the difficulty of accomplishing the high capacity, a method of suppressing the swelling of the electrode has been developed by using a high strength resin as a binder. According to this method, since the binder suppresses the swelling of the electrode, the electrode structure is maintained, and accordingly, the deterioration of the charge and discharge cycle-life may be expected to be suppressed.

As for this binder resin, a polyimide-based binder is for example known, but the polyimide-based binder is used in an organic solvent and thus has difficulties in being used as a negative electrode binder, wherein an aqueous binder is mainly used. Accordingly, the aforementioned problem has not been fundamentally solved.

On the other hand, as for an aqueous high strength binder, sodium polyacrylate is known. This binder is an aqueous binder and thus may be easily used as a negative electrode binder but has a problem of sharply deteriorating flexibility of an electrode and easily generating a crack or easily curling of the electrode during the drying and thus difficulties in handling. In addition, the swelling suppression effect is insufficient. Accordingly, this binder has not fundamentally solved the aforementioned problem.

SUMMARY OF CERTAIN INVENTIVE EMBODIMENTS

One inventive aspect is a novel and simultaneously, improved binder for a secondary battery used in aqueous solvents and easily handled as well as suppressing swelling of an electrode for a lithium ion secondary battery, a binder resin composition for a secondary battery, an electrode for a secondary battery, and a secondary battery.

Another aspect is a binder for a secondary battery which includes a first copolymer unit including a carboxyl group-containing acrylic monomer and at least one of an acrylic acid derivative monomer and a substituted or unsubstituted styrene and a second copolymer unit including a residue of a polymer azo initiator, wherein a mass ratio of the second copolymer unit relative to a total mass of the first copolymer unit and the second copolymer unit is 10 mass % to 40 mass %.

The carboxyl group-containing acrylic monomer may be selected from acrylic acid, metacrylic acid, maleic acid, mono methyl maleic acid, 2-carboxylethyl acrylate, and 2-carboxylethyl methacrylate.

The acrylic acid derivative monomer may be at least one selected from a nitrile group-containing acrylic monomer, acrylic acid ester, and acrylamide.

The nitrile group-containing acrylic monomer may be at least one selected from acrylonitrile, metaacrylonitrile, 2-cyanoethylacrylate, and 2-cyanoethylmetaacrylate.

At least one part of the carboxyl group-containing acrylic monomer may be an alkali metal salt or ammonium salt.

The first copolymer unit may include an alkali metal salt or an ammonium salt as the carboxyl group-containing acrylic monomer and a nitrile group-containing acrylic monomer as the acrylic acid derivative monomer.

The second copolymer unit may include at least one of polyether and polysiloxane as the residue of the polymer azo initiator.

According to another aspect of the present invention, a binder resin composition for a secondary battery including the binder for the secondary battery is provided.

According to another aspect of the present invention, an electrode for a secondary battery including the binder for a secondary battery is provided.

The electrode for the secondary battery may further include carboxylmethyl cellulose (CMC) as the binder for the secondary battery.

According to another aspect of the present invention, a secondary battery including the electrode for the secondary battery is provided.

The electrode for a secondary battery may be a negative electrode.

According to at least one of the disclosed embodiments, a binder for a secondary battery is an aqueous binder and thus may be used for an electrode for a secondary battery to suppress swelling of the electrode. In addition, the binder for a secondary battery has satisfactory handling property.

BRIEF DESCRIPTION OF THE DRAWINGS

FIG. 1 is a schematic cross-sectional side view showing a structure of a lithium ion secondary battery.

DETAILED DESCRIPTION OF CERTAIN INVENTIVE EMBODIMENTS

Hereinafter, referring to the drawings, embodiments are illustrated in detail. On the other hand, constituent elements substantially having the same functional structure in the present specification and drawing are assigned by the same numeral and will not be repetitively illustrated.

1. Configuration of Lithium Ion Secondary Battery

First, in accordance with FIG. 1, a configuration of a lithium ion secondary battery 10 according to the present embodiment is described. The lithium ion secondary battery 10 includes a positive electrode 20, a negative electrode 30, a separator 40, and a non-aqueous electrolyte. The lithium ion secondary battery 10 has a charge-reaching voltage (an oxidation reduction potential) of for example greater than or equal to 4.0 V (vs. Li/Li$^+$) and less than or equal to 5.0 V, particularly greater than or equal to 4.2 V and less than or equal to 5.0 V. The shape of the lithium ion secondary battery 10 is not particularly limited. That is to say, the lithium ion secondary battery 10 may have any shape such as a cylindrical, prismatic, laminate-type, or button-type shape.

(1-1. Positive Electrode 20)

The positive electrode 20 includes a current collector 21 and a positive active material layer 22. The current collector 21 may use any conductor and may be for example, aluminum (Al), stainless steel, or nickel-plated steel. The positive active material layer 22 includes at least positive active material and may further include a conductive material and a positive electrode binder.

The positive active material may be, for example lithium-containing solid solution oxide, and may be any material that can electrochemically intercalate and deintercalate lithium ions without particular limitation. The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), or $LiMn_{1.5}Ni_{0.5}O_4$.

The conductive agent may be, for example, carbon black such as ketjen black, acetylene black, and the like, natural graphite, artificial graphite, and the like, but may be any one in order to improve conductivity of a positive electrode without limitation.

The positive electrode binder may be for example polyvinylidene fluoride, an ethylene-propylene-diene terpolymer, a styrene-butadiene rubber, an acrylonitrile-butadiene rubber, a fluororubber, polyvinyl acetate, polymethyl methacrylate, polyethylene, cellulose nitrate, and the like, and may not be particularly limited if it binds the positive active material and the conductive material on the current collector 21.

The positive active material layer 22 is manufactured, for example, in the following method. That is to say, first, a positive electrode mixture is manufactured by dry-mixing the positive active material, the conductive material, and the binder for the positive electrode.

Subsequently, the positive electrode mixture is dispersed in an appropriate organic solvent to form positive electrode mixture slurry, and the positive electrode mixture slurry is coated on the current collector 21, dried, and compressed to form a positive active material layer.

(1-2. Negative Electrode 30)

The negative electrode 30 includes a current collector 31 and a negative active material layer 32. The current collector 31 may be any conductor and may consist of for example aluminum, stainless steel, nickel plated steel, and the like. The negative active material layer 32 may include at least negative active material and a negative electrode binder. The negative active material may be for example a graphite active material (artificial graphite, natural graphite, a mixture of artificial graphite and natural graphite, natural graphite coated with artificial graphite), a mixture of particulates of silicon or tin, or oxides thereof and the graphite active material, silicon or tin particulates, alloys including silicon or tin as a basic material, a titanium oxide-based compound such as $Li_4Ti_5O_{12}$, lithium nitride, and the like. The oxide of silicon is represented by $SiO_x$ ($0 \leq x \leq 2$). The negative active material may be for example metal lithium besides the above materials. On the other hand, in the present embodiment, the binder for the negative electrode has the following configurations, and thus, swelling of the electrode may be suppressed even though the negative active material that is greatly expanded and contracted during charge and discharge, for example a silicon-based active material is used.

The binder for the negative electrode includes a copolymer binder.

The binder for the negative electrode may further include a conventional negative electrode binder that is used in a lithium ion secondary battery 10 and may include for example carboxylmethyl cellulose (CMC) additionally. The copolymer binder is a block copolymer including a first copolymer repeating unit and a second copolymer repeating unit.

The first copolymer repeating unit includes a carboxyl group-containing acrylic monomer and at least one of an acrylic acid derivative monomer and a substituted or unsubstituted styrene. The first copolymer repeating unit is a repeating unit for expressing strength and electrolyte resistance of the negative electrode binder. Since the copolymer binder includes the first copolymer repeating unit, swelling of the negative electrode 30 may be suppressed. In the first copolymer repeating unit, a carboxyl group-containing acrylic monomer, and at least one of acrylic acid derivative monomer and a substituted or unsubstituted styrene are randomly copolymerized.

Herein, the carboxyl group-containing acrylic monomer may be preferably selected from acrylic acid, metacrylic acid, maleic acid, monomethyl maleic acid, 2-carboxylethyl acrylate, and 2-carboxylethyl methacrylate.

In addition, at least one part of the carboxyl group-containing acrylic monomer may preferably be an alkali metal salt or an ammonium salt. In this case, characteristics of the lithium ion secondary battery 10 may be further improved. Herein, the alkali metal salt or the ammonium salt may be an alkali metal salt or an ammonium salt of one or more selected from acrylic acid, metacrylic acid, maleic acid, and mono methyl maleic acid.

The acrylic acid derivative monomer is preferably at least one selected from a nitrile group-containing acrylic monomer, an acrylic acid ester, and acrylamide. The nitrile group-containing acrylic monomer is preferably at least one selected from acrylonitrile, metaacrylonitrile, 2-cyanoethylacrylate, and 2-cyanoethylmetaacrylate.

The first copolymer repeating unit may particularly preferably include the alkali metal salt or the ammonium salt as the carboxyl group-containing acrylic monomer and the nitrile group-containing acrylic monomer as the acrylic acid derivative monomer. In this case, characteristics of the lithium ion secondary battery 10 may be further improved.

A weight ratio of the carboxyl group-containing acrylic monomer and at least one of the acrylic acid-derived monomer and the substituted or unsubstituted styrene is not particularly limited, but may be for example 2.5:1.0 to 2.0:1.0.

A glass transition point of the first copolymer repeating unit may preferably be in the range of 150° C. or more and 250° C. or less. In this case, characteristics of the lithium ion secondary battery 10 may be further improved.

The second copolymer repeating unit includes a residue of a polymer azo initiator. The second copolymer repeating unit is a repeating unit to exhibit flexibility and swelling by the electrolyte. In other words, the negative electrode binder may deteriorate battery characteristics by a merely high strength. Thus, in the present embodiment, the second copolymer repeating unit imparts some degree of flexibility and swelling to the negative electrode binder.

Herein, the second copolymer repeating unit may include the residue of the polymer azo initiator, preferably at least one of polyether and polysiloxane. For example, polyethylene glycol is preferable for polyether.

In addition, it is preferable that a weight ratio of the second copolymer repeating unit to a total weight of the first copolymer repeating unit and the second copolymer repeating unit is 10 wt % to 40 wt %.

A glass transition point of the second copolymer repeating unit is preferably greater than or equal to −150° C. and less than or equal to 50° C.

In this case, characteristics of the lithium ion secondary battery 10 may be further improved.

(1-3. Specific Examples of First Copolymer Repeating Unit)

The first copolymer repeating unit may be for example represented by Chemical Formulae 1 to 24. The first copolymer repeating unit is not limited to the following examples.

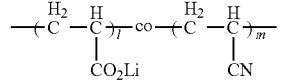
[Chemical Formula 1]

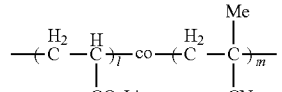
[Chemical Formula 2]

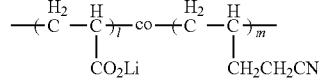
[Chemical Formula 3]

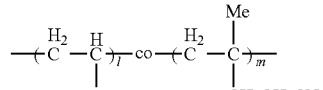
[Chemical Formula 4]

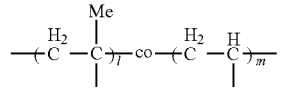
[Chemical Formula 5]

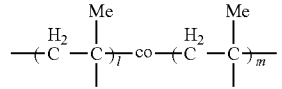
[Chemical Formula 6]

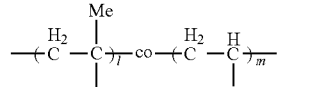
[Chemical Formula 7]

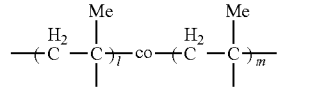
[Chemical Formula 8]

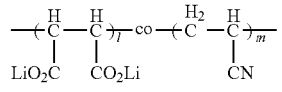
[Chemical Formula 9]

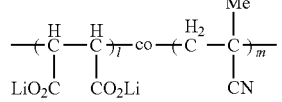
[Chemical Formula 10]

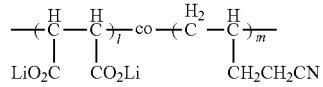
[Chemical Formula 11]

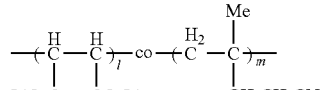
[Chemical Formula 12]

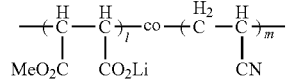
[Chemical Formula 13]

-continued

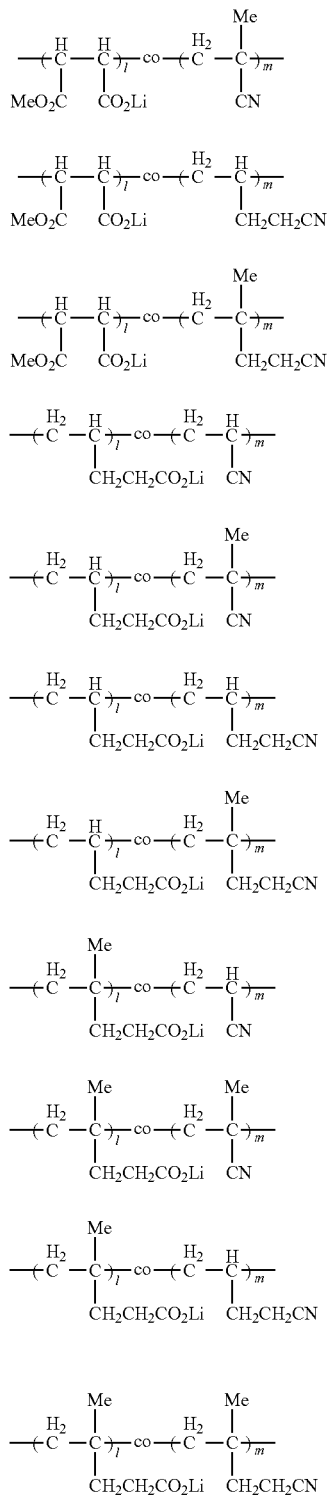

[Chemical Formula 14]

[Chemical Formula 15]

[Chemical Formula 16]

[Chemical Formula 17]

[Chemical Formula 18]

[Chemical Formula 19]

[Chemical Formula 20]

[Chemical Formula 21]

[Chemical Formula 22]

[Chemical Formula 23]

[Chemical Formula 24]

(1-4. Specific Examples of Second Copolymer Repeating Unit)

The second copolymer repeating unit may be for example represented by Chemical Formulae 25 and 26. However, the second copolymer repeating unit is not limited to the following examples.

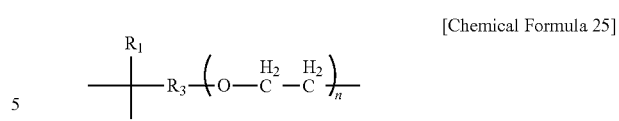

[Chemical Formula 25]

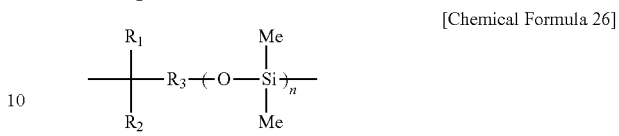

[Chemical Formula 26]

On the other hand, in Chemical Formulae 25 and 26, functional groups of $R_1$ to $R_3$ are represented by Chemical Formulae 27 to 29.

$R_1 =$ —Me, —Et, —Pr  (27)

$R_2 =$ —Me, —Et, —Pr, —CN, —CO$_2$Me, —CO$_2$Et, —CO$_2$Pr, —CONHMe, —CONHEt, —CONHPr  (28)

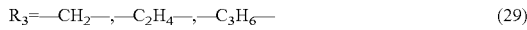

$R_3 =$ —CH$_2$—, —C$_2$H$_4$—, —C$_3$H$_6$—  (29)

Therefore, the negative electrode binder is for example represented by Chemical Formula 30 below. Of course, the negative electrode binder may have a random combination of Chemical Formulae 1 to 24 and Chemical Formulae 25 to 26.

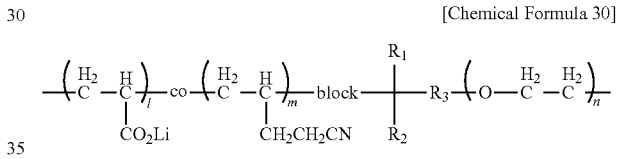

[Chemical Formula 30]

(1-5. Separator)

The separator 40 is not particularly limited and may be any separator in a lithium ion secondary battery. The separator may preferably include a porous layer or a non-woven fabric having excellent high-rate discharge performance, which may be used alone or in a mixture thereof. The resin of the separator may be for example a polyolefin-based resin such as polyethylene or polypropylene, a polyester-based resin such as polyethylene terephthalate or polybutylene terephthalate, PVDF, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

(1-6. Non-Aqueous Electrolyte)

The non-aqueous electrolyte is not particularly limited and may be any non-aqueous electrolyte in a conventional lithium secondary battery. The non-aqueous electrolyte may have a composition where an electrolytic salt in a non-aqueous solvent. The non-aqueous solvent may be, for example, cyclic carbonate esters such as propylene carbonate, ethylene carbonate, butylene carbonate, chloroethylene carbonate, or vinylene carbonate; cyclic esters such as γ-butyrolactone, or γ-valero lactone; linear carbonates such as dimethyl carbonate, diethyl carbonate, or ethyl methyl carbonate; linear esters such as methyl formate, methyl acetate, or butyric acid methyl; tetrahydrofuran or a derivative thereof; ethers such as 1,3-dioxane, 1,4-dioxane, 1,2-dimethoxyethane, 1,4-dibutoxyethane, or methyl diglyme; nitriles such as acetonitrile, or benzonitrile; dioxolane or a derivative thereof; ethylene sulfide, sulfolane, sultone or a derivative thereof, and the like, which may be used alone or as a mixture of two or more, but is not limited thereto.

The electrolytic salt may be, for example, an inorganic ion salt including lithium (Li), sodium (Na) or potassium (K) such as $LiClO_4$, $LiBF_4$, $LiAsF_6$, $LiPF_6$, $LiPF_{6-x}(C_nF_{2n+1})_x$ [wherein, $1<x<6$, and $n=1$ or 2], LiSCN, LiBr, LiI, $Li_2SO_4$, $Li_2B_{10}Cl_{10}$, $NaClO_4$, NaI, NaSCN, NaBr, $KClO_4$, KSCN, and the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4$ N-maleate, $(C_2H_5)_4$ N-benzoate, $(C_2H_5)_4$ N-phthalate, lithium dodecylbenzene sulphonate and these may be used alone or in a mixture of two or more. On the other hand, the concentration of the electrolytic salt may be the same as that of a non-aqueous electrolyte used in a conventional lithium secondary battery, and is not particularly limited. In the present embodiment, an electrolyte including an appropriate lithium compound (electrolytic salt) at a concentration of 0.8 to 1.5 mol/L may be used.

The non-aqueous electrolyte may further include various additives. The additives may include a negative electrode-acting additive, a positive electrode-acting additive, an ester-based additive, a carbonate ester-based additive, a sulfuric acid ester-based additive, a phosphoric acid ester-based additive, a boric acid ester-based additive, an acid anhydride additive, and an electrolytic additive. Any one of them may be added to a non-aqueous electrolyte or a plurality of types of additives may be added to a non-aqueous electrolyte.

<2. Method of Manufacturing Lithium Ion Secondary Battery>

Next, a method of manufacturing a lithium ion secondary battery 10 is described. The positive electrode 20 is manufactured as follows. First, a mixture of a positive active material, a conductive material, and a positive electrode binder in the above ratio is dispersed in a solvent (for example N-methyl-2-pyrrolidone) to prepare slurry. Subsequently, slurry is formed on the current collector 21 (for example applied) and dried to form a positive active material layer 22.

On the other hand, the method of applying is not particularly limited. The applying method may be for example a knife coater method, a gravure coater method, and the like.

The following applying method may be performed according to the same method. Subsequently, the positive active material layer 22 is compressed with a press so as to have a density within the ranges. Accordingly, the positive electrode 20 is manufactured.

The negative electrode 30 is manufactured according to the same method as that of the positive electrode 20. First, a negative active material and the negative electrode binder (specifically a binder resin composition including the negative electrode binder) is mixed, and the resultant mixture is dispersed in a solvent (for example N-methyl-2-pyrrolidone) to form slurry. Subsequently, the slurry is formed (for example applied) on the current collector 31 and dried to form a negative active material layer 32. The drying is preferably performed at a temperature of about 150° C. or greater. Then, the negative active material layer 32 is compressed with a press so as to have a density within the above ranges. Accordingly, the negative electrode 30 is manufactured.

Herein, the binder resin composition is prepared by heating a mixed solution (reaction solution) of monomers constituting the first copolymer repeating unit and the polymer azo initiator while stirring the solution. A weight ratio of the polymer azo initiator is 10 to 40 wt % based on a total weight of the monomers constituting the first copolymer repeating unit and the polymer azo initiator. Detailed conditions are described in the following examples.

Subsequently, the separator 40 is disposed between the positive electrode 20 and the negative electrode 30 to manufacture an electrode structure. Then, the electrode structure is manufactured to have a desired shape (for example, a cylinder, a prism, a laminate, a button, and the like) and then inserted into a container having the same shape. Then, a non-aqueous electrolyte is injected into the container in order to impregnate the electrolyte into each pore of the separator 40. In this way, a lithium ion secondary battery is manufactured.

Thus, according to the present embodiment, a binder having the above-described configuration is used as a negative electrode binder. This negative electrode binder is an aqueous binder. The details are described in the following examples, but the swelling of the negative electrode 30 is suppressed. As a result, the separation of the active material due to destruction of the electrode structure or deterioration of the electron conductivity is suppressed, thereby improving the cycle-life of the secondary battery. In addition, the negative electrode binder has good handling properties.

Modes for the Invention

Hereinafter, examples of the present invention and comparative examples are described. These examples, however, are not in any sense to be interpreted as limiting the scope of the invention.

EXAMPLES

<1. Synthesis of Binder Resin Composition>

Hereinafter, Examples of the present embodiment are described. First, synthesis examples of the binder resin composition are described. On the other hand, a mixing ratio of monomer and polymer azo initiators described hereinafter denotes a weight ratio, unless particularly refuted.

Example 1: Synthesis Example of Lithium Polyacrylate (PAALi)/Polyacrylonitrile (PAN)/Polyethylene Glycol (PEG)=60/30/10

119 g of distilled water and acrylic acid (60 g, 0.833 mol) were put in a 200 ml 4-necked separatory flask equipped with a stirrer, a thermometer, and a condensing tube, and in a diaphragm pump, an internal pressure thereof was reduced to 10 mmHg and then, recovered to a normal pressure with a nitrogen, which was three times repeated. Acrylonitrile (30 g, 0.565 mol) and a polymer azo initiator (VPE-0201 available from Wako Pure Chemical Industries, Ltd. (a PEG chain number average molecular weight: 2000), 10.0 g, 0.005 mol (the mole number as the initiator)) were added thereto, and the obtained mixture was stirred at 400 rpm. The reaction solution was reacted for 4 hours, while stably heated at 65° C. to 70° C., and then, heated up to 80° C. and reacted again for 4 hours to obtain a binder resin composition as a massive solid.

After cooled down to room temperature, lithium hydroxide 1 hydrate (34.2 g, 0.98 equivalent based on the acrylic acid) was added thereto, and the obtained mixture was stirred, until the binder resin composition was completely dissolved.

About 2 ml of the reaction solution was taken to measure a weight of a non-volatile (NV) portion, which was 13.2 wt % (a theoretical value: 13.5 wt %).

In addition, after the measurement of the non-volatile (NV) matter, about 7 to 10 mg of the binder resin composition was taken and then, heated from −100° C. to 270° C. at an increasing rate of 5° C./min under a nitrogen atmosphere in a X-DSC7000 manufactured by SII (Seiko Instruments Inc.) to measure Tg, wherein Tg derived from PEG was observed around −55° C., and Tg derived from PAALi and PAN was observed around 235° C.

Example 2: Synthesis Example of Lithium Polyacrylate (PAALi)/Polyacrylonitrile (PAN)/Polyethylene Glycol (PEG)=55/30/15

A synthesis was equally performed to that of Example 1 except that distilled water (118 g), acrylic acid (55 g, 0.763 mol), acrylonitrile (30 g, 0.565 mol), a polymer azo initiator (VPE-0201 available from Wako Pure Chemical Industries, Ltd., (a PEG chain number average molecular weight: 2000), 15.0 g, 0.0075 mol (the mole number as the initiator)), and lithium hydroxide 1 hydrate (31.4 g, 0.98 equivalent of the acrylic acid) were used. When a weight of a non-volatile (NV) portion of the reaction solution was measured, the weight was 13.2 wt % (a theoretical value of 13.5 wt %). In addition, Tg thereof was observed at two places of around −55° C. and around 235° C.

Example 3: Synthesis Example of Lithium Polyacrylate (PAALi)/Polyacrylonitrile (PAN)/Polyethylene Glycol (PEG)=50/30/20

A synthesis was equally performed to that of Example 1 except that distilled water (116 g), acrylic acid (50 g, 0.694 mol), acrylonitrile (30 g, 0.565 mol), a polymer azo initiator (VPE-0201 available from Wako Pure Chemical Industries, Ltd., (a PEG chain number average molecular weight: 2000), 20.0 g, 0.01 mol (the mole number as the initiator), and lithium hydroxide 1 hydrate (28.5 g, 0.98 equivalent based on the acrylic acid) were used. When a weight of a non-volatile (NV) portion of the reaction solution was measured, the weight was 13.0 wt % (a theoretical value: 13.5 wt %). In addition, Tg thereof was observed at two places of around −55° C. and around 235° C.

Example 4: Synthesis Example of Lithium Polyacrylate (PAALi)/Polyacrylonitrile (PAN)/Polyethylene Glycol (PEG)=50/20/30

A synthesis was equally performed to that of Example 1 except that distilled water (116 g), acrylic acid (50 g, 0.694 mol), acrylonitrile (20 g, 0.377 mol), a polymer azo initiator (VPE-0201 available from Wako Pure Chemical Industries, Ltd., (a PEG chain number average molecular weight: 2000), 30.0 g, 0.015 mol (the mole number of the initiator)), and lithium hydroxide 1 hydrate (28.5 g, 0.98 equivalent based on the acrylic acid) were used. When a weight of a non-volatile (NV) portion of the reaction solution was measured, the weight was 13.0 wt % (a theoretical value: 13.5 wt %). In addition, Tg thereof was observed at two places of around −55° C. and around 235° C.

Example 5: Synthesis Example of Lithium Polyacrylate (PAALi)/Polyacrylonitrile (PAN)/Polysiloxane=60/30/10

A synthesis was equally performed to that of Example 1 except that distilled water (119 g), acrylic acid (60 g, 0.833 mol), acrylonitrile (30 g, 0.565 mol), a polymer azo initiator (VPE-0201 available from Wako Pure Chemical Industries, Ltd., (a polysiloxane chain number average molecular weight: 10000), 10.0 g, 0.001 mol (the mole number as the initiator)), and lithium hydroxide 1 hydrate (34.2 g, 0.98 equivalent based on the acrylic acid) were used. When a mass of a non-volatile (NV) portion of the reaction solution was measured, the mass was 13.2 wt % (a theoretical value: 13.5 wt %). In addition, Tg thereof was observed at one place of around 235° C. Tg derived from polysiloxane was present at less than or equal to −100° C. out of a measurable range and thus not observed.

Example 6: Synthesis Example of Lithium Polyacrylate (PAALi)/Polyacrylonitrile (PAN)/Polysiloxane=55/30/15

A synthesis was equally performed to that of Example 1 except that distilled water (118 g), acrylic acid (55 g, 0.763 mol), acrylonitrile (30 g, 0.565 mol), a polymer azo initiator (VPE-1001 available from Wako Pure Chemical Industries, Ltd., (a polysiloxane chain number average molecular weight: 10000), 15.0 g, 0.0015 mol (the mole number as the initiator)), and lithium hydroxide 1 hydrate (31.4 g, 0.98 equivalent of the acrylic acid) were used. When a weight of a non-volatile (NV) portion of the reaction solution was measured, the weight was 13.1 wt % (a theoretical value: 13.5 wt %). In addition, Tg thereof was observed at one point of around 235° C. Tg derived from the polysiloxane was present at less than or equal to −100° C. out of a measurable range and thus not observed.

Example 7: Synthesis Example of Lithium Polyacrylate (PAALi)/Polyacrylonitrile (PAN)/Polysiloxane=50/30/15

A synthesis was equally performed to that of Example 1 except that distilled water (116 g), acrylic acid (50 g, 0.694 mol), acrylonitrile (30 g, 0.565 mol), a polymer azo initiator (VPE-1001 available from Wako Pure Chemical Industries, Ltd., (a polysiloxane chain number average molecular weight: 10000), 20.0 g, 0.002 mol (the mole number of the initiator)), and lithium hydroxide 1 hydrate (28.5 g, 0.98 equivalent based on the acrylic acid) were used. When a weight of a non-volatile (NV) portion of the reaction solution was measured, the weight was 13.1 wt % (a theoretical value: 13.5 wt %). In addition, Tg thereof was observed at one place of around 235° C. Tg derived from the polysiloxane was present at less than or equal to −100° C. out of a measurable range and thus not observed.

Example 8: Synthesis Example of Lithium Polyacrylate (PAALi)/Polyacrylonitrile (PAN)/Polysiloxane=50/20/30

A synthesis was equally performed to that of Example 1 except that distilled water (116 g), acrylic acid (50 g, 0.694 mol), acrylonitrile (20 g, 0.377 mol), a polymer azo initiator (VPE-1001 available from Wako Pure Chemical Industries, Ltd., (a polysiloxane chain number average molecular weight: 10000), 30.0 g, 0.003 mol (the mole number of the initiator)), and lithium hydroxide 1 hydrate (28.5 g, 0.98 equivalent of the acrylic acid) were used. When a weight of a non-volatile (NV) portion of the reaction solution was measured, the weight was 13.1 wt % (a theoretical value: 13.5 wt %). In addition, Tg thereof was observed at one place of around 235° C. Tg derived from the polysiloxane was present at less than or equal to −100° C. out of a measurable range and thus not observed.

2. Manufacture of Negative Electrode

Comparative Example 1

14.5 wt % of a graphite silicon composite negative electrode (a silicon content of 60 wt %), 79.0 wt % of artificial graphite, 2.0 wt % of acetylene black, 3.0 wt % of a styrene butadiene copolymer (SBR), and 1.5 wt % of carboxylmethyl cellulose (CMC) were mixed to prepare an aqueous negative electrode mixture slurry. On the other hand, a non-volatile component of the negative electrode mixture slurry was 55 wt % based on a total weight of the slurry.

(Manufacture of Negative Electrode)

Subsequently, the negative electrode mixture slurry was uniformly coated on a copper foil (a current collector, a thickness: 10 μm) with a bar coater by adjusting the mixture coating amount (surface density) after drying into 9.55 mg/cm². Subsequently, the negative electrode mixture slurry was dried with a blowing-type drier set at 80° C. for 15 minutes. Then, the negative electrode mixture after the drying was pressed with a roll presser to have active mass density of 1.65 g/cm³. Subsequently, the negative electrode mixture was vacuum-dried at 150° C. for 6 hours to manufacture a negative electrode.

Example 9

A negative electrode was manufactured according to the same method as Comparative Example 1 except that 4.5 wt % of the binder resin composition synthesized according to Example 1 was used instead of 3.0 wt % of the styrene butadiene copolymer (SBR) and 1.5 wt % of the carboxylmethyl cellulose (CMC). On the other hand, a crack was not generated during the manufacture of the negative electrode. In addition, the negative electrode was not almost curled up during the drying of the negative electrode.

Example 10

A negative electrode was manufactured according to the same method as Comparative Example 1 except that 4.5 wt % of the binder resin composition synthesized according to Example 2 was used instead of 3.0 wt % of the styrene butadiene copolymer (SBR) and 1.5 wt % of the carboxylmethyl cellulose (CMC).

Example 11

A negative electrode was manufactured according to the same method as Comparative Example 1 except that 4.5 wt % of the binder resin composition synthesized according to Example 3 was used instead of 3.0 wt % of the styrene butadiene copolymer (SBR) and 1.5 wt % of the carboxylmethyl cellulose (CMC).

Example 12

A negative electrode was manufactured according to the same method as Comparative Example 1 except that 4.5 wt % of the binder resin composition synthesized according to Example 4 was used instead of 3.0 wt % of the styrene butadiene copolymer (SBR) and 1.5 wt % of the carboxylmethyl cellulose (CMC).

Example 13

A negative electrode was manufactured according to the same method as Comparative Example 1 except that 4.5 wt % of the binder resin composition synthesized according to Example 5 was used instead of 3.0 wt % of the styrene butadiene copolymer (SBR) and 1.5 wt % of the carboxylmethyl cellulose (CMC).

Example 14

A negative electrode was manufactured according to the same method as Comparative Example 1 except that 4.5 wt % of the binder resin composition synthesized according to Example 6 was used instead of 3.0 wt % of the styrene butadiene copolymer (SBR) and 1.5 wt % of the carboxylmethyl cellulose (CMC).

Example 15

A negative electrode was manufactured according to the same method as Comparative Example 1 except that 4.5 wt % of the binder resin composition synthesized according to Example 7 was used instead of 3.0 wt % of the styrene butadiene copolymer (SBR) and 1.5 wt % of the carboxylmethyl cellulose (CMC).

Example 16

A negative electrode was manufactured according to the same method as Comparative Example 1 except that 4.5 wt % of the binder resin composition synthesized according to Example 8 was used instead of 3.0 wt % of the styrene butadiene copolymer (SBR) and 1.5 wt % of the carboxylmethyl cellulose (CMC).

Example 17

A negative electrode was manufactured according to the same method as Comparative Example 1 except that 3.0 wt % of the binder resin composition synthesized according to Example 1 was used instead of 3.0 wt % of the styrene butadiene copolymer (SBR).

Example 18

A negative electrode was manufactured according to the same method as Comparative Example 1 except that 3.0 wt % of the binder resin composition synthesized according to Example 2 was used instead of 3.0 wt % of the styrene butadiene copolymer (SBR).

Example 19

A negative electrode was manufactured according to the same method as Comparative Example 1 except that 3.0 wt % of the binder resin composition synthesized according to Example 3 was used instead of 3.0 wt % of the styrene butadiene copolymer (SBR).

Example 20

A negative electrode was manufactured according to the same method as Comparative Example 1 except that 3.0 wt % of the binder resin composition synthesized according to Example 4 was used instead of 3.0 wt % of the styrene butadiene copolymer (SBR).

Example 21

A negative electrode was manufactured according to the same method as Comparative Example 1 except that 3.0 wt % of the binder resin composition synthesized according to Example 5 was used instead of 3.0 wt % of the styrene butadiene copolymer (SBR).

Example 22

A negative electrode was manufactured according to the same method as Comparative Example 1 except that 3.0 wt % of the binder resin composition synthesized according to Example 6 was used instead of 3.0 wt % of the styrene butadiene copolymer (SBR).

Example 23

A negative electrode was manufactured according to the same method as Comparative Example 1 except that 3.0 wt % of the binder resin composition synthesized according to Example 7 was used instead of 3.0 wt % of the styrene butadiene copolymer (SBR).

Example 24

A negative electrode was manufactured according to the same method as Comparative Example 1 except that 3.0 wt % of the binder resin composition synthesized according to Example 8 was used instead of 3.0 wt % of the styrene butadiene copolymer (SBR).

Example 25

A negative electrode was manufactured according to the same method as Comparative Example 1 except that 1.5 wt % of the binder resin composition synthesized according to Example 2 and 3.0 wt % of carboxylmethyl cellulose (CMC) were used instead of 3.0 wt % of the styrene butadiene copolymer (SBR).

3. Manufacture of Positive Electrode (Preparation of Positive Electrode Mixture Slurry)
96 wt % of a solid solution oxide, $Li_{1.2}OMn_{0.55}Co_{0.10}Ni_{0.15}O_2$, 2 wt % of ketjen black, and 2 wt % of polyvinylidene fluoride were dispersed in N-methyl-2-pyrrolidone to prepare positive electrode mixture slurry. On the other hand, a non-volatile component in the positive electrode mixture slurry was 50 wt % based on a total weight of the slurry.
(Manufacture of Positive Electrode)
Subsequently, the gap of the bar coater was adjusted so as to coat the mixture in a coating amount (surface density) of 22.7 mg/cm$^2$ after the drying, and the positive electrode mixture slurry was coated on an aluminum current collector foil with the bar coater. Then, the positive electrode mixture slurry was dried with a blowing drier set at 80° C. for 15 minutes. Then, the dried positive electrode mixture was pressed to have a mixture density of 3.9 g/cm$^3$ with a roll press. Then, the positive electrode mixture was vacuum-dried at 80° C. for 6 hours, manufacturing a sheet-type positive electrode including a positive current collector and a positive active material layer.

4. Manufacture of Secondary Battery Cell

Comparative Example 2

The negative electrode of Comparative Example 1 was cut into a disk having a diameter of 1.55 cm, and the positive electrode manufactured in the positive electrode manufacturing example was cut into a disk having a diameter of 1.3 cm. Subsequently, a separator (25μ-thick polyethylene microporous film) was cut into a disk having a diameter of 1.8 cm. The positive electrode which was cut to a disk having a diameter of 1.3 cm, the separator which was cut to a disk having a diameter of 1.8 cm, the negative electrode according to Comparative Example 1 which was cut to a disk having a diameter of 1.55 cm, and a 200 μm-thick copper foil which was cut to a disk having a diameter of 1.5 cm were sequentially stacked into a stainless steel coin container having a diameter of 2.0 cm. Then, 150 μL of an electrolyte (1.4 M LiPF$_6$ dissolved in a mixed solution of ethylene carbonate/diethyl carbonate/fluoroethylene carbonate (=10/70/20 of a volume ratio of mixed solution)) was inserted into the container. Subsequently, the container was covered with a stainless steel cap after inserting a polypropylene packing therebetween and sealed with an assembler. Accordingly, a lithium ion secondary battery cell (coin cell) according to Comparative Example 2 was manufactured.

Example 26

A secondary battery cell was manufactured according to the same method as Comparative Example 2, except that the negative electrode manufactured in Example 9 was used.

Example 27

A secondary battery cell was manufactured according to the same method as Comparative Example 2, except that the negative electrode manufactured in Example 10 was used.

Example 28

A secondary battery cell was manufactured according to the same method as Comparative Example 2, except that the negative electrode manufactured in Example 11 was used.

Example 29

A secondary battery cell was manufactured according to the same method as Comparative Example 2, except that the negative electrode manufactured in Example 12 was used.

Example 30

A secondary battery cell was manufactured according to the same method as Comparative Example 2, except that the negative electrode manufactured in Example 13 was used.

Example 31

A secondary battery cell was manufactured according to the same method as Comparative Example 2, except that the negative electrode manufactured in Example 14 was used.

Example 32

A secondary battery cell was manufactured according to the same method as Comparative Example 2, except that the negative electrode manufactured in Example 15 was used.

Example 33

A secondary battery cell was manufactured according to the same method as Comparative Example 2, except that the negative electrode manufactured in Example 16 was used.

Example 34

A secondary battery cell was manufactured according to the same method as Comparative Example 2, except that the negative electrode manufactured in Example 17 was used.

Example 35

A secondary battery cell was manufactured according to the same method as Comparative Example 2, except that the negative electrode manufactured in Example 18 was used.

Example 36

A secondary battery cell was manufactured according to the same method as Comparative Example 2, except that the negative electrode manufactured in Example 19 was used.

Example 37

A secondary battery cell was manufactured according to the same method as Comparative Example 2, except that the negative electrode manufactured in Example 20 was used.

Example 38

A secondary battery cell was manufactured according to the same method as Comparative Example 2, except that the negative electrode manufactured in Example 21 was used.

Example 39

A secondary battery cell was manufactured according to the same method as Comparative Example 2, except that the negative electrode manufactured in Example 22 was used.

Example 40

A secondary battery cell was manufactured according to the same method as Comparative Example 2, except that the negative electrode manufactured in Example 23 was used.

Example 41

A secondary battery cell was manufactured according to the same method as Comparative Example 2, except that the negative electrode manufactured in Example 24 was used.

Example 42

A secondary battery cell was manufactured according to the same method as Comparative Example 2, except that the negative electrode manufactured in Example 25 was used.

5. Evaluation of Electrode Swelling

The lithium ion secondary battery cells according to each Examples and Comparative Examples were once charged and discharged at 0.2 C at 25° C. Subsequently, the lithium ion secondary battery cells were charged at 1.0 C and then, decomposed, and the negative electrodes were taken out therefrom. After washing the negative electrodes with dimethyl carbonate and wind-drying them, thicknesses of the negative electrodes were measured at a micrometer and then, compared with their initial thicknesses before the first charge and discharge to calculate swelling of the negative electrodes in a charge state. Herein, the swelling was obtained according to ((a thickness of a negative electrode after charge)−(a thickness of the negative electrode before the initial charge and discharge))/(the thickness of the negative electrode before the initial charge and discharge)×100. The evaluation results are combined and shown in Table 1.

TABLE 1

| Battery cell | Electrode | Used binder | Amount (mass %) | Swelling (%) |
|---|---|---|---|---|
| Comparative Example 2 | Comparative Example 1 | SBR/CMC | 3/1.5 | 31.0 |
| Example 26 | Example 9 | Example 1/CMC | 4.5/0 | 28.5 |
| Example 27 | Example 10 | Example 2/CMC | 4.5/0 | 29.1 |
| Example 28 | Example 11 | Example 3/CMC | 4.5/0 | 29.2 |
| Example 29 | Example 12 | Example 4/CMC | 4.5/0 | 30.0 |
| Example 30 | Example 13 | Example 5/CMC | 4.5/0 | 28.0 |
| Example 31 | Example 14 | Example 6/CMC | 4.5/0 | 28.5 |
| Example 32 | Example 15 | Example 7/CMC | 4.5/0 | 29.2 |
| Example 33 | Example 16 | Example 8/CMC | 4.5/0 | 29.5 |
| Example 34 | Example 17 | Example 1/CMC | 3/1.5 | 24.0 |
| Example 35 | Example 18 | Example 2/CMC | 3/1.5 | 24.6 |
| Example 36 | Example 19 | Example 3/CMC | 3/1.5 | 25.2 |
| Example 37 | Example 20 | Example 4/CMC | 3/1.5 | 26.0 |
| Example 38 | Example 21 | Example 5/CMC | 3/1.5 | 23.8 |
| Example 39 | Example 22 | Example 6/CMC | 3/1.5 | 24.6 |
| Example 40 | Example 23 | Example 7/CMC | 3/1.5 | 25.5 |
| Example 41 | Example 24 | Example 8/CMC | 3/1.5 | 26.9 |
| Example 42 | Example 25 | Example 2/CMC | 1.5/3 | 27.3 |

Referring to Table 1, the negative electrodes of the secondary battery cells according to the present example embodiment were suppressed from swelling.

6. Cycle-Life Evaluation

The lithium ion secondary battery cells according to Examples and Comparative Examples were once charged and discharged at 0.2 C at 25° C. Subsequently, the lithium ion secondary battery cells were charged and discharged at 1.0 C, and this charge and discharge cycle was 100 times repeated. Discharge capacity at the $100^{th}$ cycle (the $100^{th}$ cycle of the 1.0 C charge and discharge cycles) was divided by initial discharge capacity at the $1^{st}$ cycle (the $1^{st}$ cycle of the 1.0 C charge and discharge cycles) to obtain a discharge capacity retention (a percentage). As the capacity retention is larger, a cycle-life is better. The evaluation results are summarized and shown in Table 2. Referring to Table 2, excellent initial discharge capacity and capacity retention were obtained in the present example embodiment.

TABLE 2

| Battery cells | Electrode | Binder Used binder | Amount (mass %) | Initial discharge capacity (mAh) | Capacity retention (%) |
|---|---|---|---|---|---|
| Comparative Example 2 | Comparative Example 1 | SBR/CMC | 3/1.5 | 4.57 | 96.3 |
| Example 26 | Example 9 | Example 1/CMC | 4.5/0 | 4.58 | 97.1 |
| Example 27 | Example 10 | Example 2/CMC | 4.5/0 | 4.58 | 97.3 |
| Example 28 | Example 11 | Example 3/CMC | 4.5/0 | 4.59 | 96.8 |
| Example 29 | Example 12 | Example 4/CMC | 4.5/0 | 4.65 | 96.5 |
| Example 30 | Example 13 | Example 5/CMC | 4.5/0 | 4.59 | 97.3 |
| Example 31 | Example 14 | Example 6/CMC | 4.5/0 | 4.68 | 95.7 |
| Example 32 | Example 15 | Example 7/CMC | 4.5/0 | 4.68 | 95.9 |
| Example 33 | Example 16 | Example 8/CMC | 4.5/0 | 4.58 | 97.8 |
| Example 34 | Example 17 | Example 1/CMC | 3/1.5 | 4.64 | 97.7 |
| Example 35 | Example 18 | Example 2/CMC | 3/1.5 | 4.56 | 89.8 |
| Example 36 | Example 19 | Example 3/CMC | 3/1.5 | 4.56 | 83.3 |
| Example 37 | Example 20 | Example 4/CMC | 3/1.5 | 4.65 | 96.0 |
| Example 38 | Example 21 | Example 5/CMC | 3/1.5 | 4.65 | 95.5 |
| Example 39 | Example 22 | Example 6/CMC | 3/1.5 | 4.57 | 96.3 |
| Example 40 | Example 23 | Example 7/CMC | 3/1.5 | 4.581 | 97.1 |
| Example 41 | Example 24 | Example 8/CMC | 3/1.5 | 4.56 | 100.3 |
| Example 42 | Example 25 | Example 2/CMC | 1.5/3 | 4.59 | 96.8 |

Hereinbefore, one example embodiment of the present invention was illustrated in detail referring to the accompanied drawings, but the present invention is not limited thereto. While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A binder for a secondary battery, comprising:
   a first copolymer unit comprising a carboxyl group-containing acrylic monomer and at least one of an acrylic acid derivative monomer and a substituted or unsubstituted styrene; and
   a second copolymer unit comprising a residue of a polymer azo initiator,
   wherein a mass ratio of the second copolymer unit relative to a total mass of the first copolymer unit and the second copolymer unit is 10 mass % to 40 mass %,
   wherein at least one part of the carboxyl group-containing acrylic monomer is an alkali metal salt or an ammonium salt.

2. The binder of claim 1, wherein the carboxyl group-containing acrylic monomer is at least one selected from acrylic acid, methacrylic acid, maleic acid, monomethyl maleic acid, 2-carboxylethyl acrylate, and 2-carboxylethyl methacrylate.

3. The binder of claim 1, wherein the acrylic acid derivative monomer is at least one selected from a nitrile group-containing acrylic monomer, acrylic acid ester, and acrylamide.

4. The binder of claim 3, wherein the nitrile group-containing acrylic monomer is at least one selected from acrylonitrile, methacrylonitrile, 2-cyanoethylacrylate, and 2-cyanoethylmethacrylate.

5. The binder of claim 1, wherein the first copolymer unit comprises a nitrile group-containing acrylic monomer as the acrylic acid derivative monomer.

6. The binder of claim 1, wherein the second copolymer unit comprises at least one of polyether and polysiloxane as the residue of the polymer azo initiator.

7. A binder resin composition for a secondary battery comprising the binder of claim 1.

8. An electrode for a secondary battery comprising the binder of claim 1.

9. The electrode of claim 8, further comprising carboxylmethyl cellulose (CMC) as the binder for the secondary battery.

10. A secondary battery comprising the electrode of claim 8.

11. The secondary battery of claim 10, wherein the electrode is a negative electrode.

* * * * *